(12) United States Patent
Chen et al.

(10) Patent No.: US 7,831,721 B2
(45) Date of Patent: Nov. 9, 2010

(54) SYSTEM AND METHOD FOR PROVIDING IPV6 SERVICES

(75) Inventors: Baojiang Chen, Shenzhen (CN); Xin Lv, Shenzhen (CN); Hongfei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 542 days.

(21) Appl. No.: 11/568,492

(22) PCT Filed: Apr. 29, 2005

(86) PCT No.: PCT/CN2005/000604

§ 371 (c)(1),
(2), (4) Date: Jul. 5, 2007

(87) PCT Pub. No.: WO2005/107178

PCT Pub. Date: Nov. 10, 2005

(65) Prior Publication Data

US 2007/0245000 A1 Oct. 18, 2007

(30) Foreign Application Priority Data

Apr. 30, 2004 (CN) .................... 2004 1 0037280

(51) Int. Cl.
*G06F 15/173* (2006.01)
(52) U.S. Cl. .................. 709/228; 709/227; 709/223; 709/224
(58) Field of Classification Search .............. 709/202, 709/228, 226, 227, 245; 455/433; 726/15
See application file for complete search history.

(56) References Cited

U.S. PATENT DOCUMENTS

2002/0194259 A1* 12/2002 Flykt et al. .................. 709/202

(Continued)

FOREIGN PATENT DOCUMENTS

CN 1691668 B 4/2010

(Continued)

OTHER PUBLICATIONS

Simmons-Nikolova, Marianna et al, "PF 41-Packet forwarding for Seamless Use of IPv6 Devices behind IPv4-only NAT Gateways", IEEE Transactions on Consumers Electronics, vol. 51, No. 1, Feb. 2005. pp. 76-79.*

(Continued)

*Primary Examiner*—Nathan Flynn
*Assistant Examiner*—Aftab Nasir Khan
(74) *Attorney, Agent, or Firm*—Marshall, Gerstein & Borun LLP

(57) ABSTRACT

A system for providing IPv6 services, including a node registration agent for use in applying for a home address for the device, registering the device to a home agent and informing the device of the home address. A method for providing IPv6 services, comprising: the device accessing an IPv6 network and acquiring a forwarding address; the device making a remote registration to the node registration agent; the node registration agent applying for a home address for the device, registering the device to the home agent, and informing the device of the home address; the communication counterpart of the device sending messages using the home address as the destination address; the home agent receiving the message and forwarding the message to the forwarding address of the device; and eventually providing the device with the IPv6 services. Application of the system and method reduces the cost, and makes possible the IPv6 services.

7 Claims, 5 Drawing Sheets

U.S. PATENT DOCUMENTS

| | | | |
|---|---|---|---|
| 2003/0045287 A1* | 3/2003 | Taniguchi | 455/433 |
| 2003/0117965 A1 | 6/2003 | Markki et al. | |
| 2003/0185236 A1* | 10/2003 | Asano et al. | 370/469 |
| 2003/0236914 A1* | 12/2003 | Liu | 709/245 |
| 2004/0073642 A1 | 4/2004 | Iyer | 709/223 |
| 2007/0183363 A1* | 8/2007 | Liden | 370/331 |
| 2007/0258424 A1* | 11/2007 | Wable et al. | 370/338 |
| 2008/0040793 A1* | 2/2008 | Nilsen et al. | 726/15 |

FOREIGN PATENT DOCUMENTS

| | | |
|---|---|---|
| EP | 1 381 202 A2 | 1/2004 |
| JP | 2003-069593 | 3/2003 |
| JP | 2004-138221 | 5/2004 |
| WO | WO 2004/032396 A2 | 4/2004 |

OTHER PUBLICATIONS

Yen, David C. and Cooper Micah, "IPV6: business applications and implementation concerns", Computer Standards & Interfaces 28, Jun. 29, 2004, pp. 27-41.*

Carpenter, B. and Moore, K., "RFC3056—Connection of IPv6 Domains via IPv4 Clouds", www.faqs.org/rfcs/rfc3056.html. Feb. 2001.*

Huitema C. "RFC3068—An Anycast Prefix for 6to4 Relay Routers," http://www.faqs.org/rfcs/rfc3068.html, Jun. 2001.*

European Office Action for Application No. EP 05752334.2-2413, dated Mar. 6, 2008.

Wiljakka, "Transition to IPv6 in GPRS and WCDMA Mobile Networks," *IEEE Communications Magazine*, 40(4):134-140 (2002).

European Search Report for European Application No. 0572334.2, dated Apr. 19, 2007.

Reason of Rejections for Japanese Patent Application No. 2007-507647, dated Apr. 27, 2009.

European Office Action for Application No. 05 752 334.2-2413, dated Sep. 27, 2007.

International Search Report for PCT/CN2005/000604, mailed Aug. 4, 2005.

First office action with partial English translation from Chinese Application No. 200410037280X, mailed Sep. 19, 2008.

Mobiliity Support in IPv6, Jun. 2004.

* cited by examiner

SYSTEM AND METHOD FOR PROVIDING IPV6 SERVICES

CROSS REFERENCES TO RELATED APPLICATIONS

This application is the national phase of International Application No. PCT/CN2005/000604, which was filed on Apr. 29, 2005, and which, in turn, claimed the benefit of Chinese Patent Application No. 200410037280.X, which was filed on Apr. 30, 2004, the entire disclosures of which are hereby incorporated by reference.

FIELD OF THE INVENTION

The invention relates to Internet Protocol (IP) technologies, and more particularly, to a system and a method for providing Internet Protocol version 6 (IPv6) services.

BACKGROUND OF THE INVENTION

The present Internet Protocol version 4 (IPv4) has many disadvantages in such aspects as address capacity, peer-to-peer IP connection, quality of service, network security, and mobility. The huge address capacity as well as various potential advantages and functions provided by IPv6 makes it an important foundation for the next generation network. Compared with IPv4, an important advantage of IPv6 is the real mobility. Mobile Internet Protocol version 6 (Mobile IPv6) could provide more flexibility for new functions and services. Through simple extensions, Mobile IPv6 could satisfy the demands of a large number of mobile devices, and provide a globally unique IP address for each mobile terminal operating in the Internet. Thus, the global problem of mobility related to the network and the accessing technology could be solved.

Although IPv6 network has more advantages than IPv4, they will coexist for a long time. At present, almost every network and access device supports IPv4, thus it is impractical to switch from IPv4 to IPv6 quickly. In many cases of such coexistence, the devices in an IPv4 network would have the need for IPv6 services, so do the devices in an IPv6 network different from that of their communication counterparts, thus leading to the issue of how to provide IPv6 services for such devices.

In order to provide devices with IPv6 services when an IPv4 network and an IPv6 network coexist, one present solution is upgrading the present network to a network supporting the IPv4 & IPv6 dual protocol stacks. According to this solution, all the 3' layer network devices such as routers and switches, as well as user terminals in the network are upgraded to support IPv6&IPv4 dual protocol stacks. Each device has an IPv4 address and an IPv6 address. Therefore, devices could communicate with the IPv4 protocol stack when allowed; and the devices could also use the IPv6 protocol stack to communicate when the IPv4 protocol stack could not guarantee a normal communication due to the private address problem as a result of the NAT devices existing in the network.

In the prior art, devices could also access the IPv6 network for some certain services in a standard tunnel mode, wherein the tunnel may include an Intra-site Automatic Tunnel Addressing Protocol (ISATAP) tunnel, a 6 to 4 tunnel, a configured tunnel, a Tunneling IPv6 over UDP through NATs (TEREDO) tunnel. When the device accesses the IPv6 network through a standard tunnel, an IPv6 address associated to the tunnel could be acquired from a tunnel gateway through which the device could make communications to receive IPv6 services.

SUMMARY OF THE INVENTION

A method for providing Internet Protocol version 6 (IPv6) services, includes:
  setting a node registration agent in advance in an IPv6 network;
  a device accessing the IPv6 network and acquiring a forwarding address;
  registering the device to the node registration agent which applies for a home address for the device, registers the home address to a home agent and informs the device of the home address;
  a communication counterpart of the device sending a message using the home address as the destination address;
  the home agent, after receiving the message, forwarding the message to the forwarding address of the device;
  providing the device with IPv6 services.

A system for providing Internet Protocol version 6 (IPv6) services, includes:
  an IPv6 network;
  a home agent in the IPv6 network; and
  a node registration agent used in the IPv6 network to apply for a home address for a device from the home agent, register for the device to the home agent, and inform the device of the home address.

DETAILED DESCRIPTION OF THE INVENTION

To make the purpose, solution and advantages of the invention clearer, the invention will be described in more detail hereinafter with reference to the drawings.

The key idea of the invention is to add a node registration agent in an IPv6 network. The node registration agent could apply for a home address for a device, registers the home address to a home agent for the device and informs the device of the home address applied for. When the device accesses the local IPv6 network from another IPv6 network, the home address could be acquired for the device through a remote registration by the node registration agent; then the device binds the home address with the forwarding address acquired while accessing the IPv6 network, and communicates through the mobile IPv6 forwarding mechanism to obtain the IPv6 service. When a device accesses the IPv6 network from an IPv4 network through a tunnel, a tunnel gateway is further added to the system. The tunnel gateway supports not only the remote registration from the tunnel gateway to the node registration agent, but also device message forwarding, thus the device could acquire the home address through the remote registration, and receive the IPv6 service through the message forwarding via the tunnel gateway.

Figure 1:
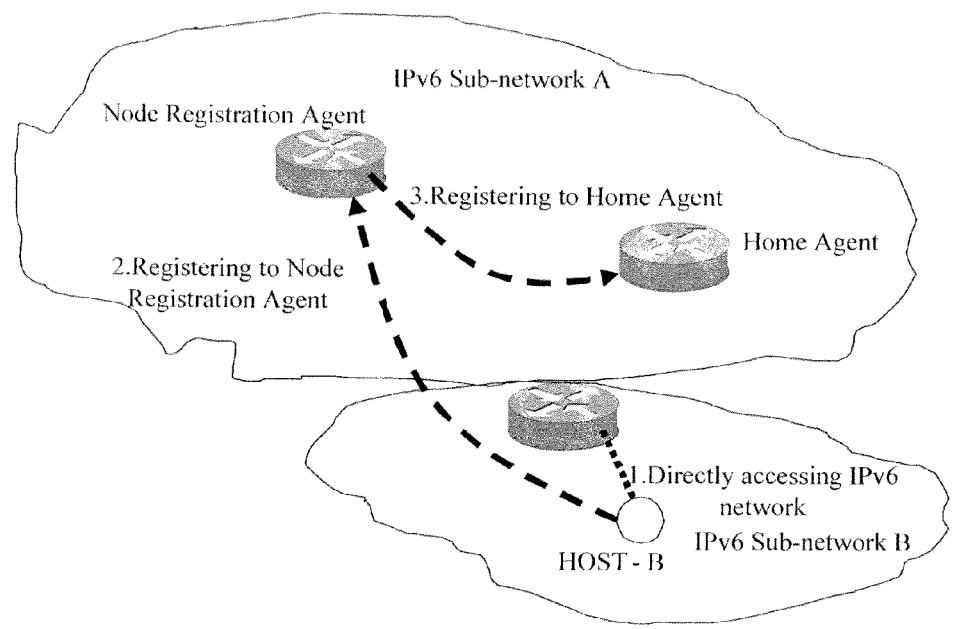
FIG. 1 is a schematic diagram illustrating a system for providing IPv6 services in accordance with an embodiment of the invention.

FIG. 1 is a schematic diagram illustrating a system for providing IPv6 services in accordance with an embodiment of the invention. As is shown in FIG. 1, the system includes an IPv6 sub-network A, an IPv6 sub-network B and a node registration agent in the IPv6 sub-network A. The node registration agent applies for a home address for the device, registers the home address to the home agent for the device and informs the device of the home address applied for. When the device accesses the IPv6 sub-network A from the IPv6 sub-network B, the device first acquires a forwarding address, and makes a remote registration to the node registration agent; the node registration agent applies for a home address for the device, registers the home address to the home agent for the device, and informs the device of the home address; the device then acquires the home address from the node registration agent and binds the home address with the forwarding address; eventually the device is communicated with through the mobile IPv6 forwarding mechanism so as to be provided with the IPv6 service.

Figure 2:
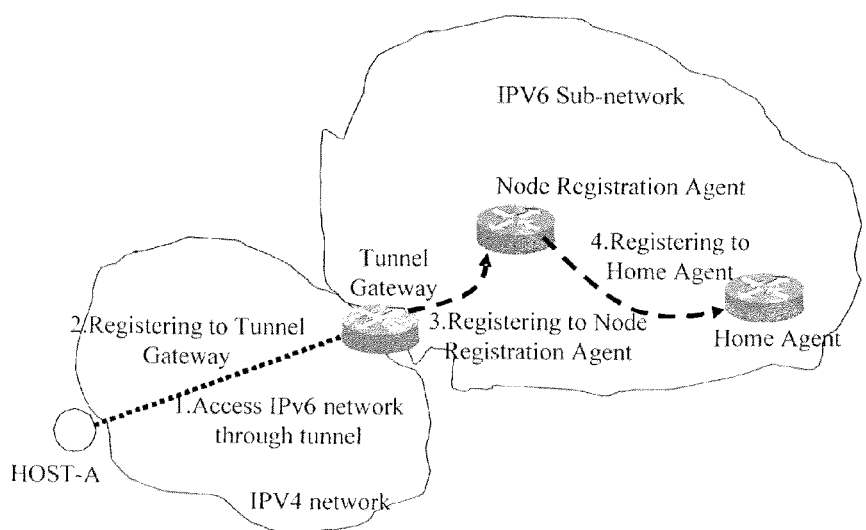
FIG. 2 is a schematic diagram illustrating a system that provides IPv6 services for devices accessing through a tunnel in accordance with an embodiment of the invention.

Based upon FIG. 1, FIG. 2 is a schematic diagram illustrating a system for providing the device accessing through a tunnel with the IPv6 service in accordance with an embodiment of the invention. As shown in FIG. 2, the system includes the IPv6 sub-network, the node registration agent in the IPv6 sub-network, an IPv4 network and a tunnel gateway between the IPv4 network and the IPv6 network. The node registration agent applies for the home address for the device, registers the home address to the home agent for the device and informs the device of the home address applied for. The tunnel gateway supports not only the remote registration from the tunnel gateway to the node registration agent, but also device message forwarding. While accessing the IPv6 network through the tunnel, the device acquires the IPv6 address, which could be assumed to be an IPv6 address A; the device registers to the tunnel gateway; the tunnel applies for, for the device, an IPv6 address B which is routable in both the IPv6 network which the device accesses and the IPv6 network where the communication counterpart of the device locates, and sets up a mapping relation from the IPv6 address A to the routable IPv6 address B; the tunnel gateway registers the device to the home agent, acquires the home address of the device from the node registration agent; after the device acquires the home address, the home address of the device is determined; and the IPv6 address A is taken as the forwarding address 1 of the device while the IPv6 address B is taken as the forwarding address 2 of the device; and all the messages sent to the device through these addresses could be used in a session in a mobile IPv6 terminal, thus providing the devices with the IPv6 service.

In specific implementation, the node registration agent shown in FIG. 1 and FIG. 2 could be a supplementary function on the home agent device, or be integrated in the other networks, or be a separate network device. The tunnel gateway shown in FIG. 2 could be a separate device, or be another device in the sub-network where the tunnel access device locates.

Figure 3:
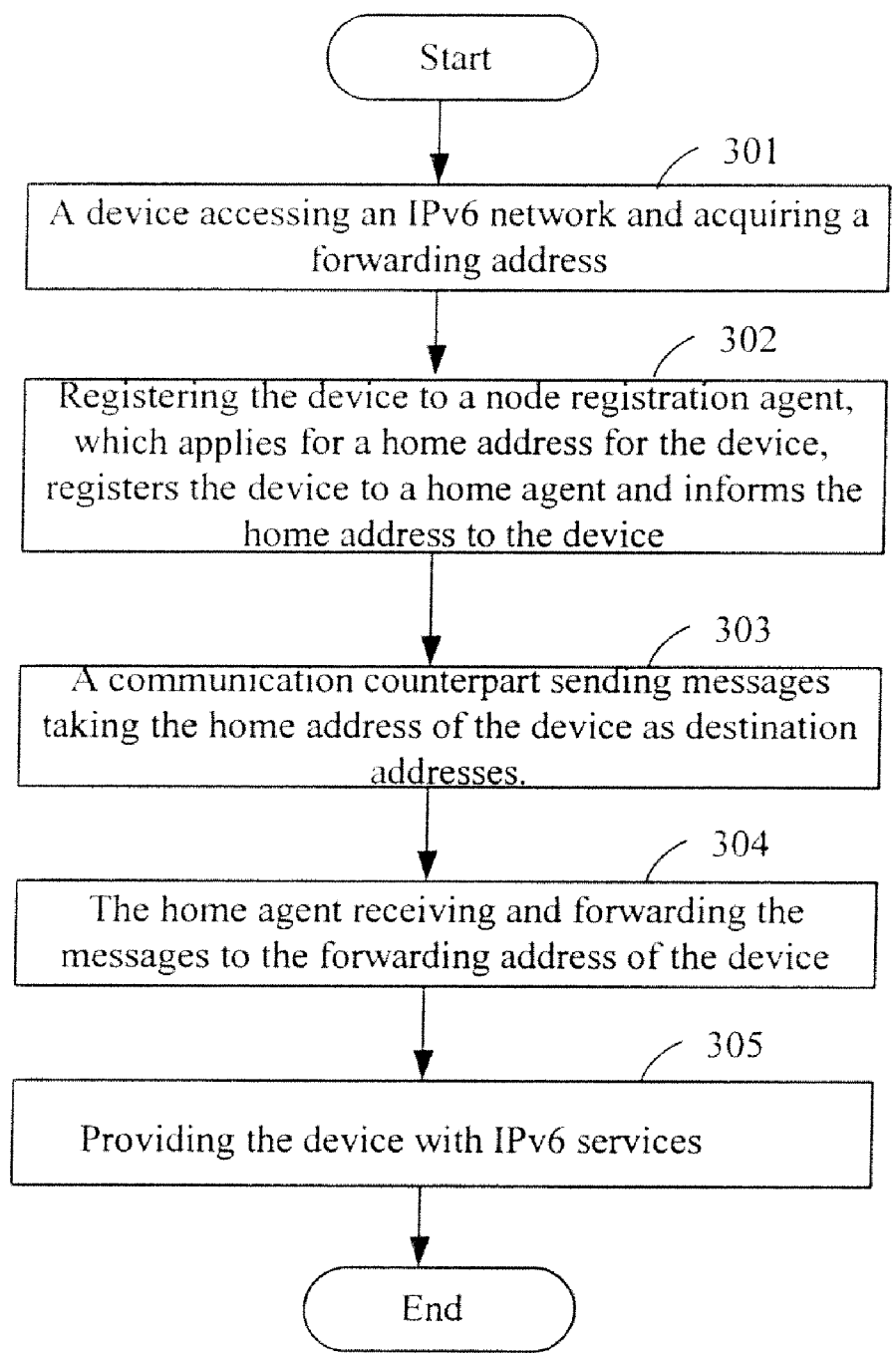
FIG. 3 is the overall flowchart of providing IPv6 services in accordance with the invention.

FIG. 3 is a flow chart illustrating the process of providing IPv6 services in accordance with the invention. The process includes:

Step 301: The device accessing an IPv6 network, acquiring a forwarding address.

Step 302: Registering the device to a node registration agent; the node registration agent applying for the home address, registering the home address to the home agent for the device, and informing the device of the home address;

Step 303: A communication counterpart of the device sending a message taking the home address of the device as the destination address;

Step 304: The home agent receiving and forwarding the message to the forwarding address of the device;

Step 305: The device setting up a communication connection after receiving the message, which makes it possible to provide the device with the IPv6 service.

In the above process, in Step 301, the device could access the IPv6 network from an IPv4 network through a tunnel or directly access the IPv6 network from another IPv6 network. If the device accesses the IPv6 network through a tunnel, the tunnel gateway and the mobile IPv6 forwarding mechanism will be used in Step 305 for providing the IPv6 service; if the device accesses the IPv6 network directly from another IPv6 network, the mobile IPv6 forwarding mechanism will be used in Step 305 for providing the IPv6 service.

Figure 4:
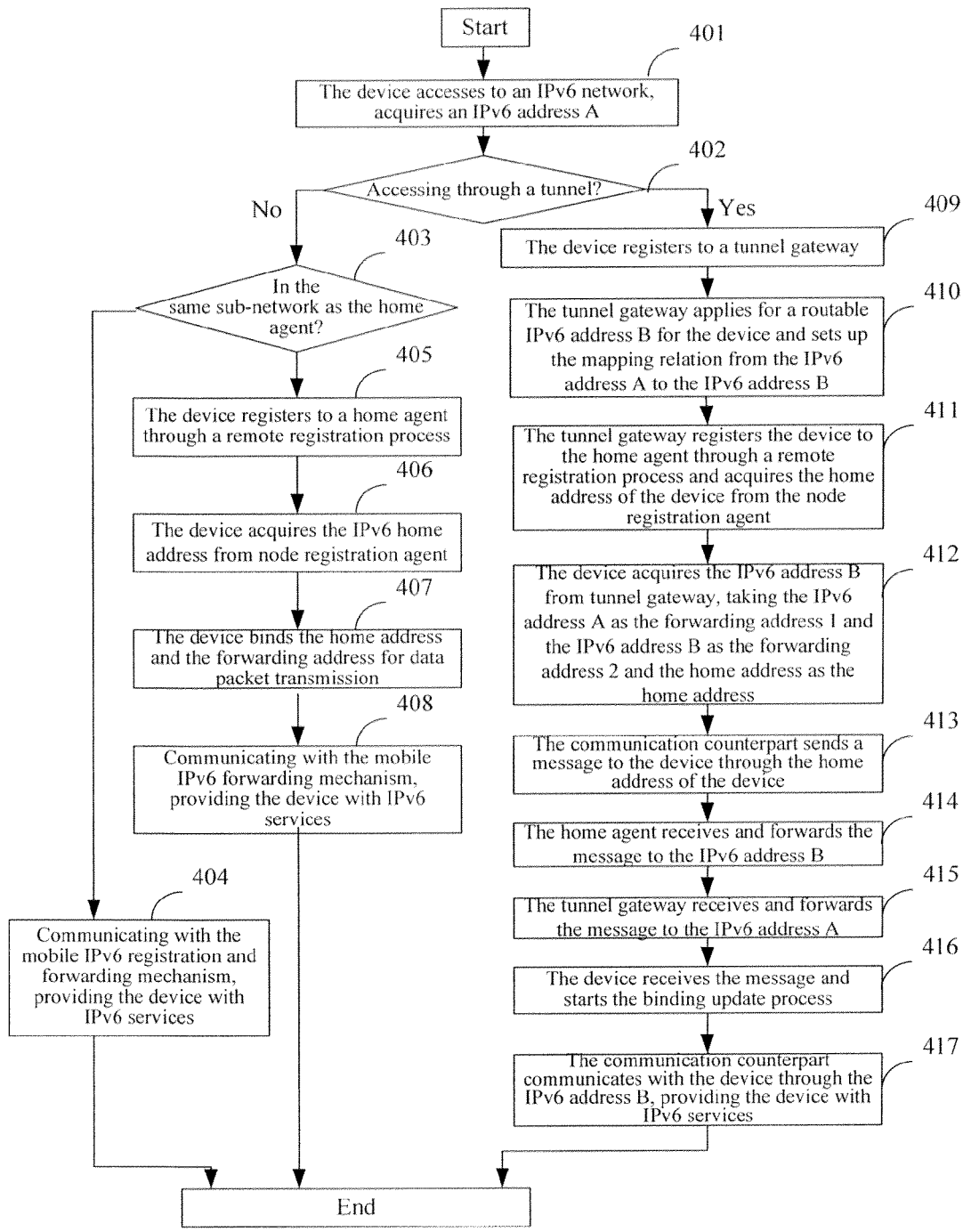
FIG. 4 is the flowchart of providing IPv6 services in accordance with an embodiment of the invention.

Based upon the overall flow chart for providing IPv6 services illustrated in FIG. 3, FIG. 4 is a flow chart illustrating the process of providing the IPv6 service in accordance with an embodiment of the invention, which includes:

Step 401: The device accessing an IPv6 network, acquiring an IPv6 address A.

The device will acquire an IPv6 address when accessing the IPv6 network, which could be assumed to be IPv6 address A.

Step 402: Determining whether the device accesses the IPv6 network through a tunnel, if the device accesses the IPv6 network through a tunnel, proceeding to Step 409 and the subsequent steps, otherwise proceeding to Step 403 and the subsequent steps.

Step 403: Determining whether the device is in the same sub-network as the home agent, if the device is in the same sub-network as the home agent, proceeding to Step 404, otherwise proceeding to Step 405 and the subsequent steps.

Step 404: Conducting communications through the mobile IPv6 registration and forwarding mechanism, providing the device with the IPv6 service, and then terminating the process.

Here, when the device accesses the IPv6 sub-network from another IPv6 sub-network directly, if the device is in the same IPv6 sub-network as the home agent, the communications for providing the IPv6 service could be conducted through the mobile IPv6 registration and forwarding mechanism instead of the remote registration mechanism.

Step 405: Registering the device remotely to the home agent through the node registration agent.

Step 406: The device acquiring the IPv6 home address from the node registration agent.

Step 407: The device binding the home address with the forwarding address for data packet transmission, i.e. for receiving and sending the messages.

Step 408: Conducting communications using the mobile IPv6 forwarding mechanism to provide the IPv6 service for the device.

Steps 405 to 408 are the registration process of a device that accesses the local IPv6 sub-network from another IPv6 sub-network but is not in the same sub-network as the home agent. The device could receive the IPv6 service by communicating with the mobile IPv6 forwarding mechanism in Step 408.

Step 409: The device registers to the tunnel gateway.

Step 410: The tunnel gateway applying for a routable IPv6 address B for the device and setting up the mapping relation from the IPv6 address A to the IPv6 address B.

Since the IPv6 address A may not be a routable IPv6 address in the Internet, at this time, the device could not start the remote registration mechanism directly. However, as the tunnel gateway through which the device accesses the IPv6 network could route the messages that have IPv6 addresses, the tunnel gateway could apply for, for the device, an IPv6 address which is routable in not only the IPv6 network which the device accesses but also the IPv6 network where the communication counterpart of the device locates, and the routable address is assumed to be the IPv6 address B. In the tunnel gateway, the IPv6 address B in the source or destination address of the forwarding message is mapped to the IPv6 address A. Then the device will have two IPv6 addresses, i.e. the IPv6 address A and the IPv6 address B. The IPv6 address A is used to forward the messages between the tunnel gateway and the device while the IPv6 address B is used to forward the messages between the tunnel gateway and the IPv6 network.

Step 411: The tunnel gateway registering at the home agent through the remote registration mechanism for the device and acquiring the home address from the node registration agent.

After the device acquires the IPv6 address B, the tunnel gateway starts the remote registration mechanism and registers the device to the home agent, then informs the home agent of the IPv6 address B of the device as the forwarding address of the device. During this process, the tunnel gateway will also acquire the home address of the device and inform the device of the home address.

Step 412: The device acquiring the IPv6 address B from the tunnel gateway, taking the IPv6 address A as the forwarding address 1 and the IPv6 address B as the forwarding address 2.

The home address of the device is determined after the device acquires it, and the IPv6 address A is taken as the forwarding address 1 of the device while the IPv6 address B is taken as the forwarding address 2 of the device. The device binds the IPv6 address A, the IPv6 address B and the home address, and the messages sent to the device through these addresses could be used in a session in a mobile IPv6 terminal.

Steps 409 to 412 are the registration process at the tunnel gateway and the home agent when the device accesses an IPv6 network through a tunnel. Thereafter, communications between the device and the communication counterpart could be set up for providing the IPv6 service.

Step 413: The communication counterpart sending the message to the device through the home address of the device.

When the device accesses the IPv6 network through a tunnel and completes the registration at the tunnel gateway and the home agent, the message sent to the device by the communication counterpart will be sent to the home address of the device first.

Step 414: The home agent receiving and forwarding the message to the IPv6 address B.

The home agent forwards the message to the IPv6 address B of the device after receiving the message sent from the communication counterpart so that the tunnel gateway could receive the message.

Step 415: The tunnel gateway receiving and forwarding the message to the IPv6 address A.

The tunnel gateway forwards the message to the IPv6 address A of the device so that the device could receive the message sent by the communication counterpart through the tunnel.

Step 416: The device receiving the message, and starting a binding update process.

The device starts a routine binding update process after receiving the message and informs the communication counterpart about the IPv6 address B, making the communication counterpart adopt the IPv6 address B of the device as the destination address when sending the subsequent messages.

Step 417: The communication counterpart communicating with the device through the IPv6 address B of the device and providing the device with the IPv6 service.

After the device informs the communication counterpart through the binding update process of the IPv6 address B for use in communicating with the device, the subsequent messages sent by the communication counterpart will adopt the IPv6 address B of the device as the destination address. The tunnel gateway receives the messages that have the IPv6 address B from the communication counterpart, forwards the messages to the IPv6 address A, and eventually makes the messages received by the device.

Figure 5:
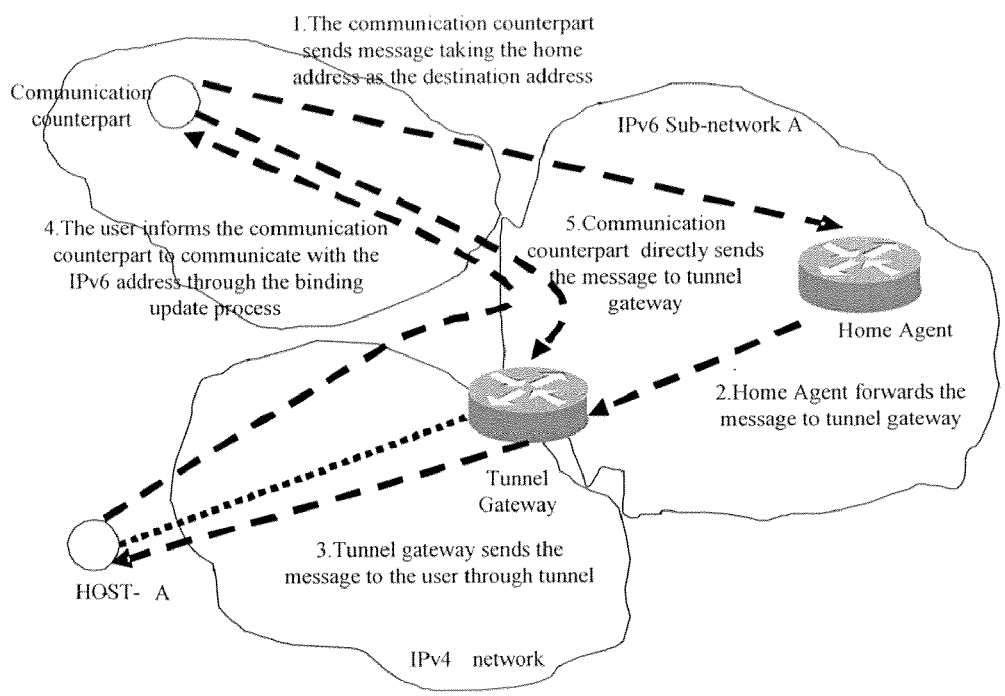
FIG. 5 is a schematic diagram illustrating the IPv6 services provided for a device accessing an IPv6 network through a tunnel in accordance with an embodiment of the invention.

Steps 413 to 417 are the process of setting up communications between the device and the communication counterpart for receiving IPv6 service. FIG. 5 is the schematic diagram illustrating how to provide a device accessing the IPv6 network through a tunnel with the IPv6 service in accordance with an embodiment of the invention.

After a device accesses the IPv6 network and completes the registration, if the device roams to an IPv4 network, the device then has to access the IPv6 network through a tunnel. Assuming that the IPv6 address acquired when the device accesses the IPv6 network through a tunnel is the IPv6 address C, since the IPv6 address C may not be a routable IPv6 address, the device may not be able to communicate with the communication counterpart using the normal mobile IPv6 forwarding mechanism. At this time, the device needs to register to the tunnel gateway which will then assign a new IPv6 address for the device. This IPv6 address, assumed to be the IPv6 address D, will be routable in both the IPv6 network which the device accesses and the IPv6 network where the communication counterpart of the device locates. The tunnel gateway also needs to register at the home agent for the device so as to inform the home agent of the forwarding address of the device, i.e. the IPv6 address D. The gateway then sets up the mapping relation from the IPv6 address C to the IPv6 address D.

Figure 6:
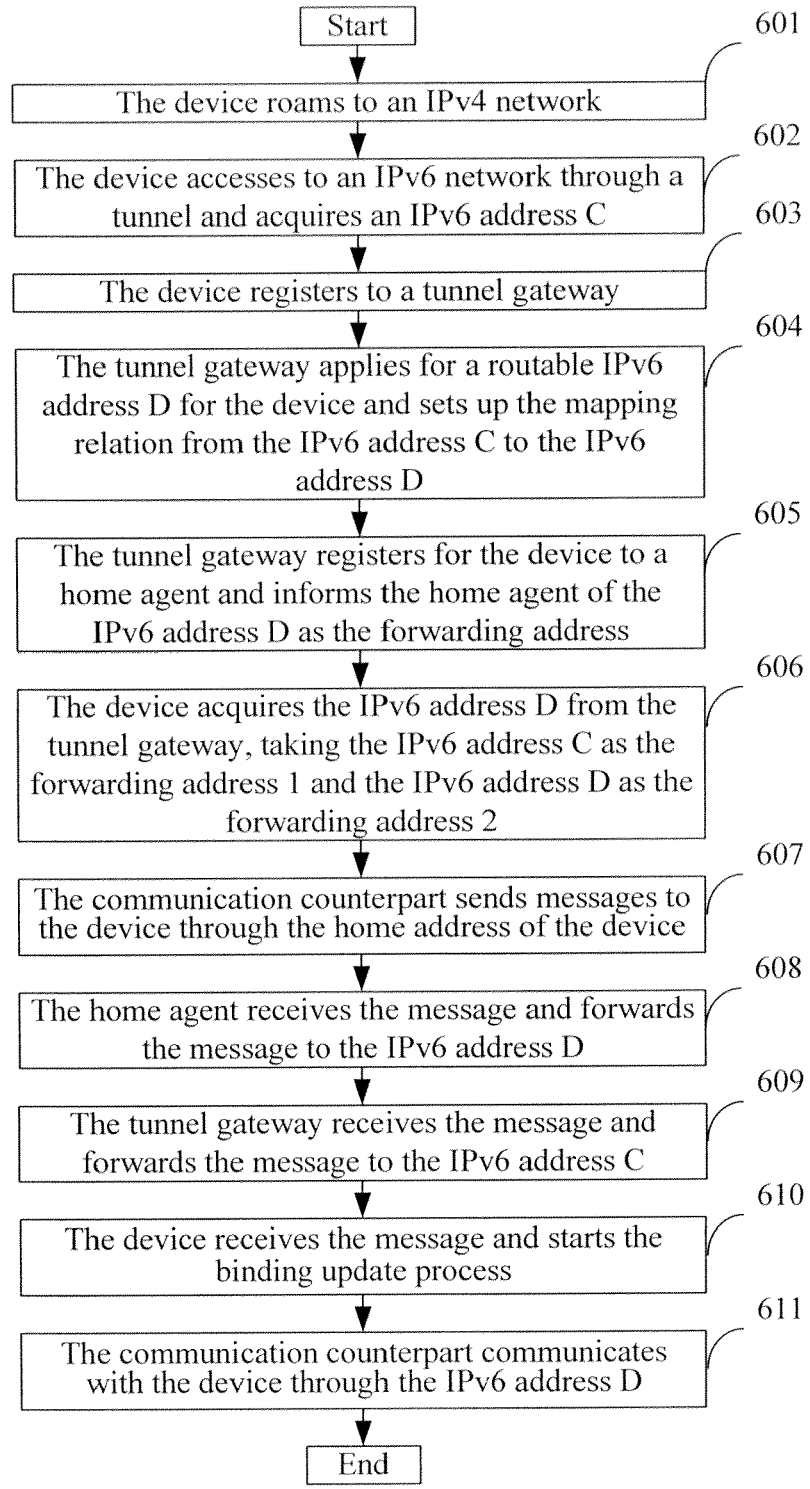
FIG. 6 is the flowchart of providing a device roaming to a IPv4 network with IPv6 services in accordance with an embodiment of the invention.

After the device accesses the IPv6 network and registers to the home agent, the device may roam to an IPv4 network and receive the IPv6 service in the IPv4 network. FIG. 6 is a flow chart illustrating the process of providing the IPv6 service for a device roaming to an IPv4 network in accordance with an embodiment of the invention. The process includes:

Step 601: The device roaming to an IPv4 network;

Step 602: The device accessing the IPv6 network through a tunnel and acquiring the IPv6 address C;

Step 603: The device registering to the tunnel gateway;

Step 604: The tunnel gateway requesting for the device the IPv6 address D which is routable in both the IPv6 network which the device accesses and the IPv6 network where the communication counterpart of the device locates, and setting up the mapping relation from the IPv6 address C to the IPv6 address D;

Step 605: The tunnel gateway registering for the device to the home agent and informing the home agent of the IPv6 address D as the forwarding address of the device;

Step 606: The device acquiring the IPv6 address D from the tunnel gateway, taking the IPv6 address C as the forwarding address 1 and the IPv6 address D as the forwarding address 2;

Step 607: The communication counterpart sending the message using the home address of the device as the destination address;

Step 608: The home agent receiving the message, and then forwarding the message to the IPv6 address D;

Step 609: The tunnel gateway receiving the message, and forwarding the message to the IPv6 address C;

Step 610: The device receiving the message, and starting the binding update process;

Step 611: The communication counterpart communicating with the device through the IPv6 address D of the device to receive the IPv6 service.

The foregoing description is illustrative of the invention and not to be construed as limiting the invention. Various modifications, equivalent substitutions and improvement can be made without departing from the spirit and scope of the invention, and should be covered by the scope of the appended claims and their equivalents.

What is claimed is:

1. A method for providing Internet Protocol version 6 (IPv6) services, comprising:
    setting a node registration agent in advance in an IPv6 network;
    a device accessing the IPv6 network and acquiring a forwarding address;
    registering the device to the node registration agent which applies for a home address for the device, registers the home address to a home agent and informs the device of the home address;
    a communication counterpart of the device sending a message using the home address as the destination address;
    the home agent obtaining the forwarding address of the device;
    the home agent, after receiving the message, forwarding the message to the device with the forwarding address of the device;
    providing the device with IPv6 services; wherein
    providing the device with the IPv6 services comprises
        when the device roaming to an Internet Protocol version 4 (IPv4) network with the IPv6 services, the device accessing the IPv6 network through a tunnel and acquiring a first IPv6 address and registering the device to a tunnel gateway,
        the tunnel gateway applying for a routable second IPv6 address for the device, setting up a mapping relation from the first IPv6 address to the routable second IPv6 address, and registering the routable second IPv6 address to the home agent for the device and informing the home agent that the routable IPv6 address is the forwarding address of the device,
        the device acquiring the second IPv6 address from the tunnel gateway,
        the communication counterpart of the device sending a message through the home address of the device,
        the home agent receiving the message and forwarding the message to the second IPv6 address,
        the tunnel gateway receiving the message and forwarding the message to the first IPv6 address; the device receiving the message and starting a binding update process, and
        the communication counterpart communicating with the device through the second IPv6 address, the device receiving the IPv6 services.

2. The method according to claim 1, wherein the device accessing the IPv6 network comprises the device accessing the IPv6 network from the IPv4 network through a tunnel gateway;
    wherein between (1) the device accessing the IPv6 network and acquiring the forwarding address and (2) registering the device to the node registration agent which applies for the home address for the device, registers the home address to the home agent and informs the device of the home address, the method further comprises registering the device to the tunnel gateway which applies for a routable IPv6 address for the device and sets up a mapping relation from the forwarding address to the routable IPv6 address;
    wherein registering the device to the node registration agent comprises the tunnel gateway registering the device to the node registration agent;
    wherein the node registration agent informing the device of the home address comprises the node registration agent informing the tunnel gateway of the home address, and the tunnel gateway informing the device of the home address;
    wherein forwarding the message to the forwarding address of the device comprises the home agent forwarding the message to the routable IPv6 address, the tunnel gateway forwarding the message to the forwarding address; and
    wherein between the home agent forwarding the message to the forwarding address of the device and providing the device with IPv6 services, the method further comprises the device instructing the communication counterpart through a binding update process to communicate with the device using the routable IPv6 address.

3. The method according to claim 1, wherein the device accessing the IPv6 network comprises the device directly accessing the local IPv6 network from an IPv6 network other than the local IPv6 network; and
    wherein providing the device with the IPv6 services comprises forwarding the message using the mobile IPv6 forwarding mechanism to provide the IPv6 services for the device.

4. A system for providing Internet Protocol version 6 (IPv6) services, comprising:
    an IPv6 network;
    a home agent in the IPv6 network; and
    a node registration agent used in the IPv6 network to apply for a home address for a device from the home agent, register for the device to the home agent, and inform the device of the home address; and
    an Internet Protocol version 4 (IPv4) network and a tunnel gateway, wherein the tunnel gateway is located between the IPv4 network and the IPv6 network for supporting a remote registration from the tunnel gateway to the node registration agent and for forwarding device messages, and
        wherein when the device roaming to the IPv4 network with IPv6 services, the device accesses the IPv6 network through a tunnel and acquires a first IPv6 address and registers the device to the tunnel gateway,
        wherein the tunnel gateway applies for a routable second IPv6 address for the device, sets up a mapping relation from the first IPv6 address to the routable second IPv6 address, and registers the routable second IPv6 address to the home agent for the device and informs the home agent that the routable second IPv6 address is the forwarding address of the device,
        wherein the device acquires the second IPv6 address from the tunnel gateway,
        wherein the communication counterpart of the device sends a message through the home address of the device,
        wherein the home agent receives the message and forwards the message to the second IPv6 address,
        wherein the tunnel gateway receives the message and forwards the message to the first IPv6 address,
    wherein the device receives the message and starts a binding update process, and
    wherein the communication counterpart communicates with the device through the second IPv6 address, the device receives the IPv6 services.

5. The system according to claim 4, wherein the node registration agent is integrated on the home agent or is a separate device.

6. The system according to claim 4, wherein the tunnel gateway is a separate device or a device in the sub-network where the tunnel access device locates.

7. The system according to claim 4, wherein the node registration agent is integrated on the home agent or is a separate device.

* * * * *